United States Patent
Nagura et al.

(10) Patent No.: US 10,801,671 B2
(45) Date of Patent: *Oct. 13, 2020

(54) GAS SUPPLY SYSTEM AND HYDROGEN STATION

(71) Applicant: Kabushiki Kaisha Kobe Seiko Sho (Kobe Steel, Ltd.), Hyogo (JP)

(72) Inventors: Kenji Nagura, Takasago (JP); Tetsuya Kakiuchi, Takasago (JP); Takashi Okuno, Takasago (JP); Koji Noishiki, Takasago (JP); Akitoshi Fujisawa, Kobe (JP); Shinichi Miura, Kobe (JP)

(73) Assignee: Kabushiki Kaisha Kobe Seiko Sho (Kobe Steel, Ltd.), Hyogo (JP)

(*) Notice: Subject to any disclaimer, the term of this patent is extended or adjusted under 35 U.S.C. 154(b) by 183 days.

This patent is subject to a terminal disclaimer.

(21) Appl. No.: 15/993,236

(22) Filed: May 30, 2018

(65) Prior Publication Data

US 2018/0274726 A1 Sep. 27, 2018

Related U.S. Application Data

(62) Division of application No. 15/116,382, filed as application No. PCT/JP2015/052578 on Jan. 29, 2015, now Pat. No. 10,634,283.

(30) Foreign Application Priority Data

| Feb. 21, 2014 | (JP) | .................................. | 2014-031945 |
| May 16, 2014 | (JP) | .................................. | 2014-102064 |
| Oct. 15, 2014 | (JP) | .................................. | 2014-210783 |

(51) Int. Cl.
*F17C 5/00* (2006.01)
*F04B 41/02* (2006.01)
(Continued)

(52) U.S. Cl.
CPC .............. *F17C 5/007* (2013.01); *B60K 15/07* (2013.01); *B60S 5/02* (2013.01); *F04B 41/02* (2013.01);
(Continued)

(58) Field of Classification Search
CPC ......... B60K 15/07; B60K 15/063; B60S 5/02; F17C 2205/0107; F17C 2205/0111;
(Continued)

(56) References Cited

U.S. PATENT DOCUMENTS 1,668,771 A * 5/1928 Kellogg .................. F25B 31/00
62/218
2,242,588 A 5/1941 McGrath
(Continued)

FOREIGN PATENT DOCUMENTS

| JP | 2003-336795 A | 11/2003 |
| JP | 2003343795 A | 12/2003 |

(Continued)

OTHER PUBLICATIONS

International Search Report issued in PCT/JP2015/052578; dated Apr. 28, 2015.
(Continued)

*Primary Examiner* — Andrew D Stclair
(74) *Attorney, Agent, or Firm* — Studebaker & Brackett PC

(57) ABSTRACT

A gas supply system (2) includes a compressor unit (21), an accumulator unit (23), a pre-cooling system (24) and a housing (4). In the gas supply system (2), the compressor unit (21) is vertically arranged and the pre-cooling system (24) is arranged above the accumulator unit (23) in the housing (4). The compressor unit (21) and the accumulator unit (23) are covered by one rectangular parallelepiped housing (4).

16 Claims, 14 Drawing Sheets

(51) Int. Cl.
  *F17C 5/06* (2006.01)
  *B60K 15/07* (2006.01)
  *B60S 5/02* (2006.01)
  *F17C 7/00* (2006.01)
  *F17C 13/00* (2006.01)

(52) U.S. Cl.
  CPC .............. *F17C 5/06* (2013.01); *F17C 7/00* (2013.01); *F17C 13/002* (2013.01); *F17C 2205/0111* (2013.01); *F17C 2205/0142* (2013.01); *F17C 2205/0376* (2013.01); *F17C 2221/012* (2013.01); *F17C 2223/0123* (2013.01); *F17C 2223/033* (2013.01); *F17C 2225/0123* (2013.01); *F17C 2225/036* (2013.01); *F17C 2227/0128* (2013.01); *F17C 2227/0157* (2013.01); *F17C 2227/0164* (2013.01); *F17C 2227/0344* (2013.01); *F17C 2227/0348* (2013.01); *F17C 2227/0353* (2013.01); *F17C 2227/0355* (2013.01); *F17C 2227/0388* (2013.01); *F17C 2227/041* (2013.01); *F17C 2250/043* (2013.01); *F17C 2250/0452* (2013.01); *F17C 2250/072* (2013.01); *F17C 2250/075* (2013.01); *F17C 2260/018* (2013.01); *F17C 2260/038* (2013.01); *F17C 2260/042* (2013.01); *F17C 2265/061* (2013.01); *F17C 2265/063* (2013.01); *F17C 2265/065* (2013.01); *F17C 2270/0139* (2013.01); *Y02E 60/32* (2013.01); *Y02E 70/30* (2013.01); *Y02P 90/45* (2015.11)

(58) Field of Classification Search
  CPC ........ F17C 2221/012; F17C 2227/0351; F17C 5/007; F17C 2227/0337–0355
  See application file for complete search history.

(56) References Cited

U.S. PATENT DOCUMENTS

| | | | | |
|---|---|---|---|---|
| 2,529,275 | A * | 11/1950 | Blumer | F17C 13/04 137/588 |
| 4,522,159 | A | 6/1985 | Engel et al. | |
| 4,531,558 | A * | 7/1985 | Engel | B60K 15/03006 123/525 |
| 5,263,826 | A | 11/1993 | Baumann et al. | |
| 5,361,796 | A * | 11/1994 | Mutter | F16K 11/0743 137/14 |
| 6,732,769 | B2 | 5/2004 | Del Campo | |
| 6,755,225 | B1 * | 6/2004 | Niedwiecki | B60P 3/14 141/18 |
| 6,786,245 | B1 * | 9/2004 | Eichelberger | B60S 5/02 141/18 |
| 6,810,925 | B2 | 11/2004 | Graham et al. | |
| 2003/0056960 | A1 | 3/2003 | Del Campo | |
| 2003/0164202 | A1 * | 9/2003 | Graham | B60S 5/02 141/98 |
| 2003/0209282 | A1 | 11/2003 | Satou et al. | |
| 2005/0236145 | A1 * | 10/2005 | Arai | F28D 1/0461 165/133 |
| 2006/0180240 | A1 | 8/2006 | Niedzwiechi et al. | |
| 2007/0261756 | A1 | 11/2007 | Handa | |
| 2010/0326095 | A1 * | 12/2010 | Van Horn | F25B 1/10 62/77 |
| 2012/0216915 | A1 * | 8/2012 | Takata | F17C 5/06 141/82 |
| 2013/0233388 | A1 * | 9/2013 | Utal | F17C 5/007 137/1 |

FOREIGN PATENT DOCUMENTS

| | | |
|---|---|---|
| JP | 2005020929 A | 1/2005 |
| JP | 2006-519344 A | 8/2006 |
| JP | 2011-132876 A | 7/2011 |
| JP | 2011-174528 A | 9/2011 |
| JP | 2013-015155 A | 1/2013 |
| JP | 2013-024287 A | 2/2013 |
| JP | 2013-057384 A | 3/2013 |
| JP | 2013-167288 A | 8/2013 |

OTHER PUBLICATIONS

Shinichi Miura; "Kobe Seiko Group no Suiso Station eno Torikumi to Kiki Seihin Maker kara Mita Cost Down eno Torikumi"; Mar. 4, 2014; pp. 1-34; Kobe Steel Group.

Shinichi Miura et al.; "Technical Developments and Kobe Steel's Business Approach for Hydrogen Filling Stations"; R&D Kobe Steel Engineering Reports; Feature: Natural Resources and Energy; Apr. 23, 2014; pp. 49-53; vol. 64; No. 1.

Schafer, Simon; "From Pilot Plant to Series Product: Technical Optimisation of Hydrogen Fueling Stations"; Sep. 30, 2013; pp. 1-27; The Linde Group.

Notification Concerning Transmittal of International Preliminary Report on Patentability (Chapter I) and Translation of Written Opinion of the International Searching Authority; PCT/JP2015/052578 dated Sep. 1, 2016.

An Office Action; issued by the U.S. Patent and Trademark Office on Mar. 13, 2018, which corresponds to U.S. Appl. No. 15/116,382.

* cited by examiner

GAS SUPPLY SYSTEM AND HYDROGEN STATION

CROSS REFERENCE TO RELATED APPLICATIONS

This application is a Divisional Application of U.S. patent application Ser. No. 15/116,382 filed Aug. 3, 2016, which is the U.S. National Phase Application of International Application No. PCT/JP2015/052578, filed Jan. 29, 2015, which claims benefit of Japanese Patent Application Nos. 2014-031945 filed Feb. 21, 2014, 2014-102064 filed May 16, 2014, 2014-210783 filed Oct. 15, 2014, the entire contents of which are incorporated herein by reference.

TECHNICAL FIELD

The present invention relates to a gas supply system and a hydrogen station.

BACKGROUND ART

A hydrogen compressing apparatus used in a hydrogen station is disclosed in patent literature 1. The hydrogen compressing apparatus is such that a hydrogen compressing apparatus main body, a compressor drive motor, a gas cooler and the like are installed on a common base. Hydrogen gas increased in pressure stepwise to a predetermined pressure in the hydrogen compressing apparatus is temporarily stored in an accumulator unit. To supply the hydrogen gas increased in pressure to a fuel cell vehicle, a dispenser with an adapter compatible with a fueling port of the fuel cell vehicle is connected to the accumulator unit.

A hydrogen station disclosed in patent literature 2 includes a first support base, a compressor, a first accumulator, a dispenser, a heat exchanger for cooling hydrogen gas supplied to the dispenser and a first expansion unit connection branch line. The compressor, the first accumulator, the heat exchanger and the dispenser are arranged on the first support base. The first expansion unit connection branch line is connected to a second accumulator constituting a first accumulator unit for expansion (accumulator unit for expansion).

In the hydrogen compressing apparatus disclosed in patent literature 1, a horizontally extending cylinder is provided and an area occupied by a hydrogen compressor is large. Further, the gas cooler having a relatively large size is used. As a result, the hydrogen compressing apparatus is enlarged. Furthermore, since the hydrogen compressing apparatus and the accumulator unit are provided as separate bodies, the entire hydrogen station is enlarged. In the hydrogen station disclosed in patent literature 2, since the compressor, the first accumulator, the heat exchanger and the dispenser are arranged on the first support base, an installation area of the first support base is large.

CITATION LIST

Patent Literature

Patent literature 1: Japanese Unexamined Patent Publication No. 2011-132876
Patent literature 2: Japanese Unexamined Patent Publication No. 2013-57384

SUMMARY OF INVENTION

The present invention aims to reduce an installation area of a gas supply system.

The present invention is directed to a gas supply system for supplying gas to filling equipment for filling gas into a tank-mounted apparatus, including a compressor unit including a driver and a compressor configured to compress the gas by being driven by the driver, a accumulator unit including a plurality of accumulators and configured to store the gas discharged from the compressor unit, a pre-cooling system configured to cool the gas flowing into the filling equipment from the accumulator unit, and a rectangular parallelepiped housing configured to house at least a part of the pre-cooling system, the compressor unit and the accumulator unit, the compressor unit being arranged with the compressor located above the driver and the at least the part of the pre-cooling system being arranged above the accumulator unit on a side of the compressor unit in the housing.

Further, the present invention is directed to a gas supply system for supplying gas to filling equipment for filling gas into a tank-mounted apparatus, including a compressor unit including a driver and a compressor configured to compress the gas by being driven by the driver, a accumulator unit including a plurality of accumulators and configured to store the gas discharged from the compressor unit, a pre-cooling system configured to cool the gas flowing into the filling equipment from the accumulator unit, and a rectangular parallelepiped housing configured to house at least a part of the pre-cooling system, the compressor unit and the accumulator unit, the accumulator unit being located laterally to the compressor unit and the at least the part of the pre-cooling system being located at least either below the accumulator unit or above the compressor unit.

DESCRIPTION OF EMBODIMENTS

First Embodiment

Figure 1:
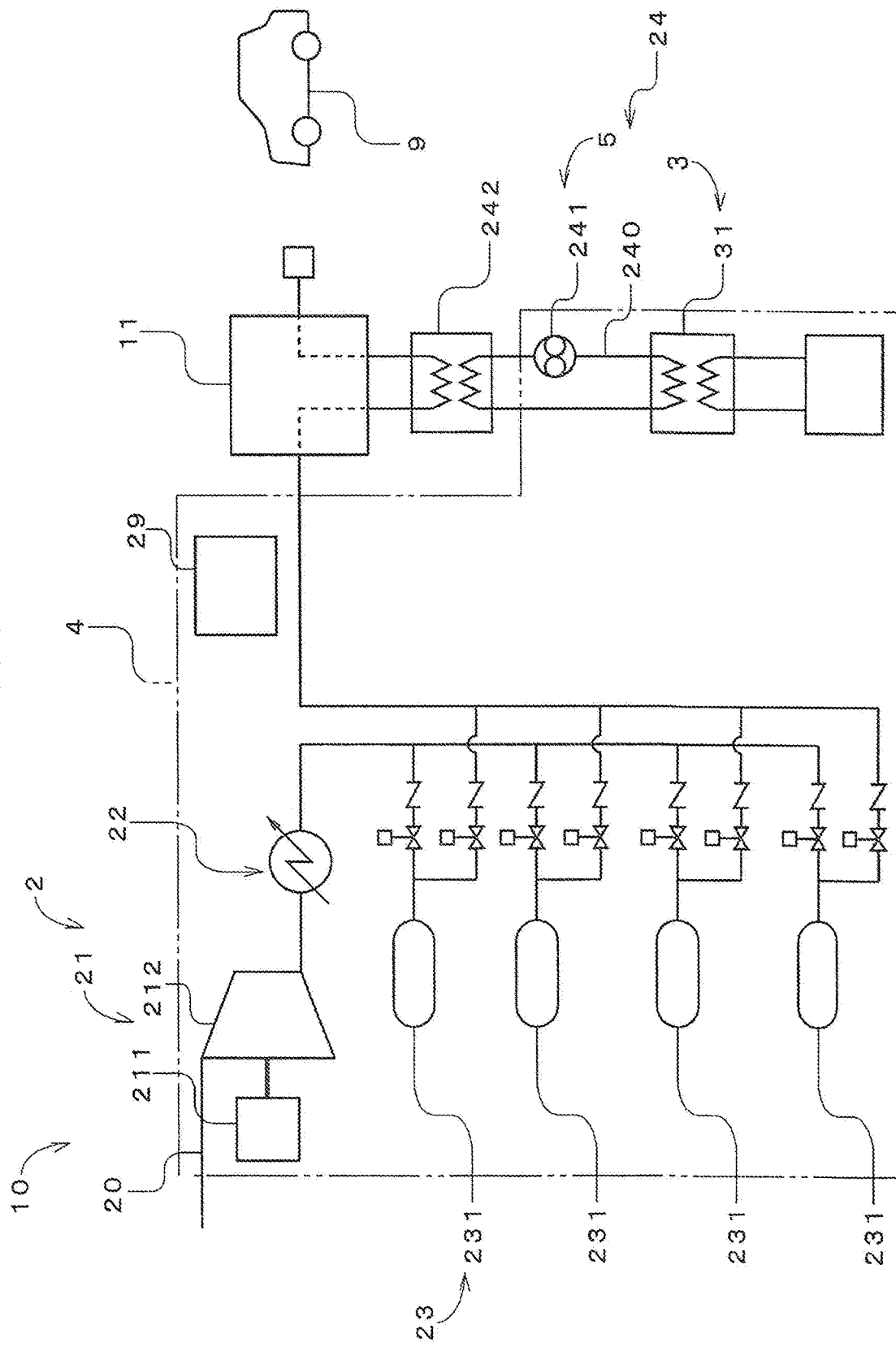
FIG. 1 is a diagram showing a hydrogen station including a gas supply system according to a first embodiment of the present invention.

FIG. 1 is a diagram showing a hydrogen station 10 according to a first embodiment of the present invention.

The hydrogen station 10 includes a gas supply system 2 and a dispenser 11 as filling equipment. The gas supply system 2 supplies hydrogen gas to the dispenser 11. The dispenser 11 fills the hydrogen gas into a vehicle which is a tank-mounted apparatus. The vehicle 9 is, for example, a fuel cell vehicle. The gas supply system 2 includes a gas flow path 20, a compressor unit 21, a gas cooling unit 22, an accumulator unit 23, a pre-cooling system 24, a housing 4 shown by chain double-dashed line and a control unit 29. The compressor unit 21, a part of the gas cooling unit 22 and the accumulator unit 23 are arranged on the gas flow path 20. The hydrogen gas flows toward the dispenser 11 in the gas flow path 20. The control unit 29 controls the compressor unit 21, the accumulator unit 23 and the pre-cooling system 24. Most of devices of the gas supply system 2 are housed in the housing 4 (described in detail later).

The compressor unit 21 is a reciprocating compressor and includes a driver 211 and compressors 212. The compressor 212 includes a piston and a cylinder, and gas is compressed in the cylinder by driving the piston by the power of the driver 211. In this embodiment, there are five compressors 212. The gas cooling unit 22 cools the hydrogen gas discharged from the compressors 212.

Figure 2:
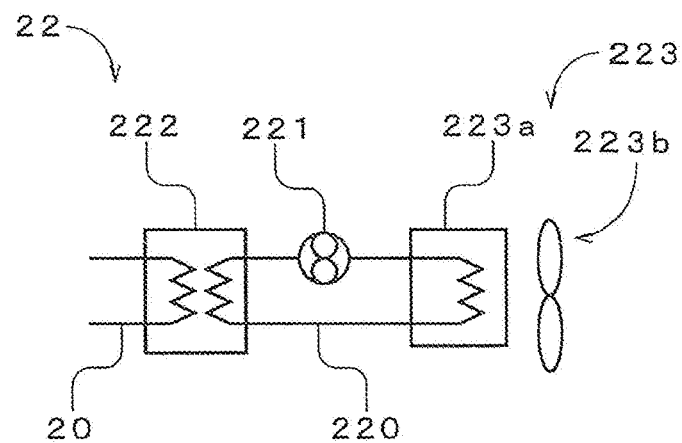
FIG. 2 is a diagram showing a gas cooling unit.

FIG. 2 is a diagram showing the configuration of the gas cooling unit 22. The gas cooling unit 22 includes a cooling water flow path 220 filled with cooling water as cooling fluid, a cooling water pump 221, gas coolers 222 and a heat exhauster 223. The gas cooler 222 is a microchannel heat exchanger. The gas flow path 20 shown in FIGS. 1 and 2 is connected to the gas cooler 222. The heat exhauster 223 includes a heat exchanger 223a and a fan 223b. The cooling water pump 221, the gas coolers 222 and the heat exchanger 223a of the heat exhauster 223 are arranged in the cooling water flow path 220. In the gas cooling unit 22, the hydrogen gas discharged from discharging portions of the compressors 212 and the cooling water exchange heat in the gas coolers 222, whereby the hydrogen gas in the gas flow path 20 is cooled. The cooling water having absorbed heat flows into the heat exchanger 223a of the heat exhauster 223 and is cooled by the flow of air generated by the fan 223b. The cooled cooling water is fed to the gas coolers 222 again by the cooling water pump 221.

Figure 3:
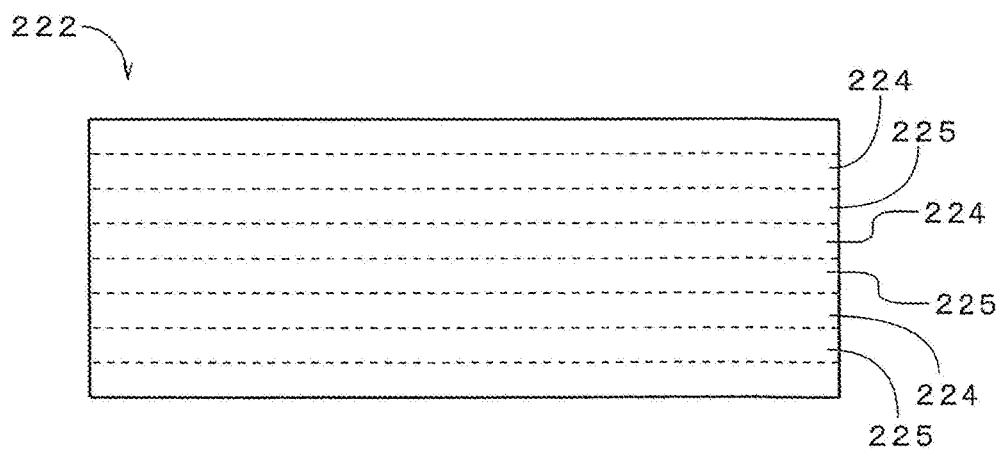
FIG. 3 is a diagram showing a gas cooler.

FIG. 3 is a schematic diagram of the gas cooler 222. In FIG. 3, inflow portions and outflow portions for the cooling water and hydrogen gas are not shown. The gas cooler 222 includes a plurality of first plates 224 and a plurality of second plates 225. The gas cooler 222 is a laminated body in which the first plates 224 and the second plates 225 are alternately laminated. The plates 224, 225 adjacent to each other are bonded by diffusion bonding.

Figure 4:
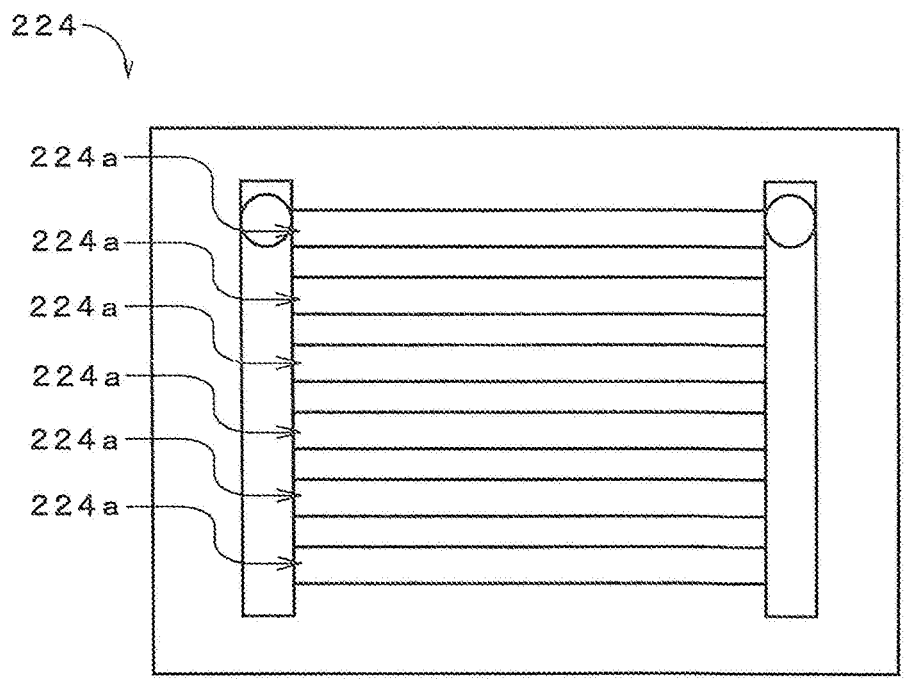
FIG. 4 is a plan view of a first plate.
Figure 5:
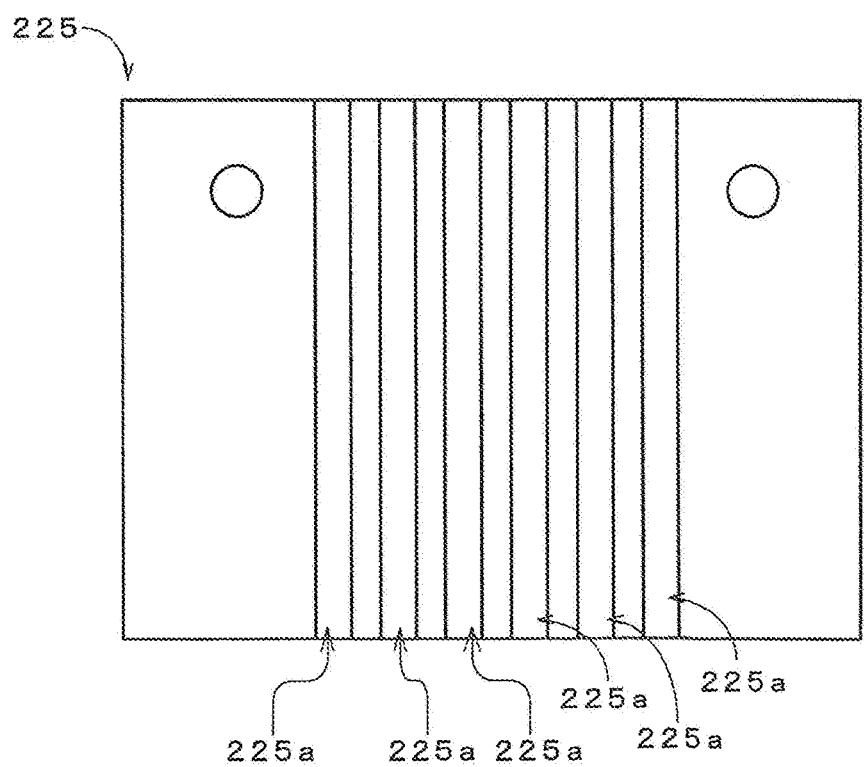
FIG. 5 is a plan view of a second plate.

FIG. 4 is a plan view of the first plate 224. The first plate 224 is formed with a plurality of gas flow paths 224a in which the hydrogen gas flows. FIG. 5 is a plan view of the second plate 225. The second plate 225 is formed with a plurality of cooling water flow paths 225a in which the cooling water flows. The hydrogen gas flowing in the gas flow paths 224a is cooled by the flow of the cooling water in the cooling water flow paths 225a.

The accumulator unit 23 shown in FIG. 1 includes four accumulators 231 having the same design pressure. The hydrogen gas discharged from the compressor unit 21 is stored in each accumulator 231.

The pre-cooling system 24 includes a refrigerator 3 and a brine circuit 5. In FIG. 1, devices of the refrigerator 3 other than an evaporator 31 are shown by one rectangle. The brine circuit 5 includes a brine flow path 240, a brine pump 241 and a pre-cooling heat exchanger 242 which is a microchannel heat exchanger. Note that the brine circuit 5 may be provided with an unillustrated brine tank for storing brine. Brine is filled and the brine pump 241, the pre-cooling heat exchanger 242 and the refrigerator 3 are arranged in the brine flow path 240.

In the brine circuit 5, the hydrogen gas and the brine exchange heat in the pre-cooling heat exchanger 242, whereby the hydrogen gas before being filled into the vehicle 9 from the dispenser 11 is cooled. The brine having absorbed heat flows into the refrigerator 3 to be cooled. The cooled brine is fed to the pre-cooling heat exchanger 242 again by the brine pump 241.

Figure 6:
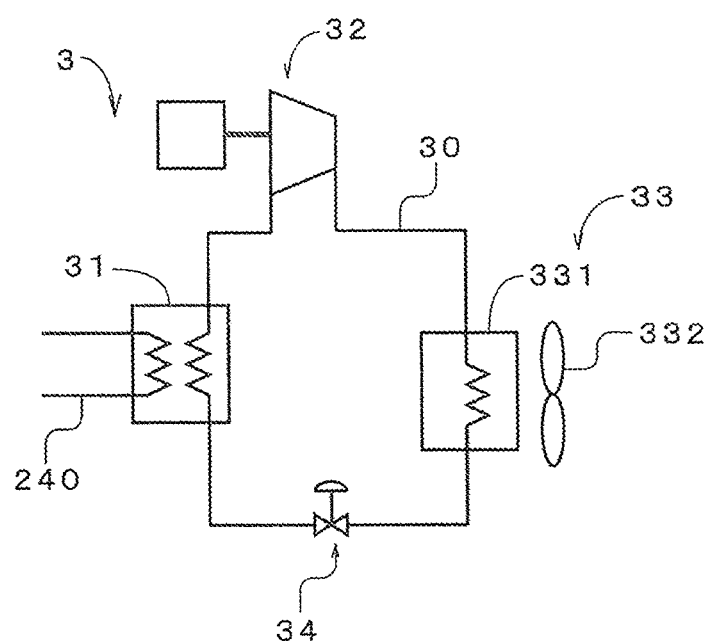
FIG. 6 is a diagram showing a refrigerator.

FIG. 6 is a diagram showing the configuration of the refrigerator 3. The refrigerator 3 includes a refrigerant flow path 30, the evaporator 31, a refrigerant compressor 32, a condenser 33 and an expander 34. A refrigerant is filled and the evaporator 31, the refrigerant compressor 32, the condenser 33 and the expander 34 are arranged in the refrigerant flow path 30. The evaporator 31 is connected to the brine flow path 240 shown in FIGS. 1 and 6. In the evaporator 31, the brine and the refrigerant exchange heat, whereby the brine is cooled and the refrigerant evaporates. The refrigerant compressor 32 shown in FIG. 6 compresses the refrigerant flowing out from the evaporator 31. The condenser 33 includes a heat exchanger 331 through which the refrigerant flows, and a fan 332. The refrigerant flowing into the heat exchanger 331 from the refrigerant compressor 32 is dissipated in heat and condensed by the flow of air generated by the fan 332. The expander 34 expands the refrigerant flowing out from the condenser 33 and the expanded refrigerant flows into the evaporator 31. In this way, the brine is cooled by a so-called heat pump cycle in the pre-cooling system 24.

When the hydrogen gas is filled into the vehicle 9 shown in FIG. 1, the hydrogen gas fed from an unillustrated gas supply source is compressed by the compressor unit 21 and stored in the accumulator unit 23 in advance while being cooled by the gas cooling unit 22.

When the vehicle 9 is carried into the hydrogen station 10, the hydrogen gas is supplied to the dispenser 11 from the accumulator unit 23 and the dispenser 11 fills the hydrogen gas into the vehicle 9 in accordance with a predetermined filling protocol.

At this time, in the accumulator unit 23, the hydrogen gas is first fed from two accumulators 231 (e.g. upper two accumulators 231 in FIG. 1). In the following description, these two accumulators are denoted by "231a" in the case of being distinguished from the other accumulators. The dispenser 11 indirectly measures a pressure in the vehicle 9 and sends the gas supply system 2 with an instruction to stop the feed of the hydrogen gas from the accumulators 231a when judging that a pressure difference between in the vehicle 9 and in the accumulators 231a has dropped to or below a predetermined value.

Subsequently, the gas supply system 2 releases another accumulator 231 (e.g. the third accumulator 231 from the top in FIG. 1). This causes the hydrogen gas to be fed from this accumulator 231 to the dispenser 11. Hereinafter, this third accumulator is denoted by "231b" in the case of being distinguished from the other accumulators. In this way, a pressure difference between in the dispenser 11 (or accumulator 231b) and in the vehicle 9 is recovered and a flow rate of the hydrogen gas to be filled into the vehicle 9 is ensured. If a pressure of a tank in the vehicle 9 increases and the dispenser 11 judges that the pressure difference between in the accumulator 231b and in the vehicle 9 has dropped to or below the predetermined value, the gas supply system 2 stops the feed of the hydrogen gas from the accumulator 231b and releases still another accumulator (one located on a lower side in FIG. 1). This causes the hydrogen gas to be fed from this other accumulator. In this way, the pressure difference between the dispenser 11 and in the vehicle 9 is ensured and a sufficient amount of the hydrogen gas is filled. When the pressure of the tank in the vehicle 9 is judged to have reached a set value, the supply of the hydrogen gas from the gas supply system 2 is stopped.

As described above, in the accumulator unit 23, two accumulators 231a of the four accumulators 231 are used in a low-pressure region (e.g. 0 MPa to 40 MPa) of the tank of the vehicle 9, another accumulator 231b is used in a medium-pressure region (40 MPa to 60 MPa) and still another accumulator is used in a high-pressure region (60 MPa to 70 MPa). The gas supply system 2 switches the accumulators 231 according to three pressure regions of the vehicle 9, whereby the dispenser 11 can efficiently fill the hydrogen gas in accordance with the filling protocol. Further, by using two accumulators 231a in the low-pressure region where a required flow rate of the hydrogen gas is higher than in the medium- and high-pressure regions, the flow rate of the hydrogen gas is ensured as compared to the case where only one accumulator is used. Thus, the hydrogen gas can be efficiently filled into the vehicle 9 even if the accumulators 231a are small in size.

Next, a positional relationship of each device of the gas supply system 2 is described. In the gas supply system 2, the compressor unit 21 and the accumulator unit 23 are housed in the housing 4 shown by chain double-dashed line. Further, various devices of the pre-cooling system 24 except the pre-cooling heat exchanger 242 and the condenser 33 (see FIG. 6) of the refrigerator 3 and various devices of the gas cooling unit 22 except the heat exhausting unit 223 shown in FIG. 2 are also housed in the housing 4.

Figure 7:
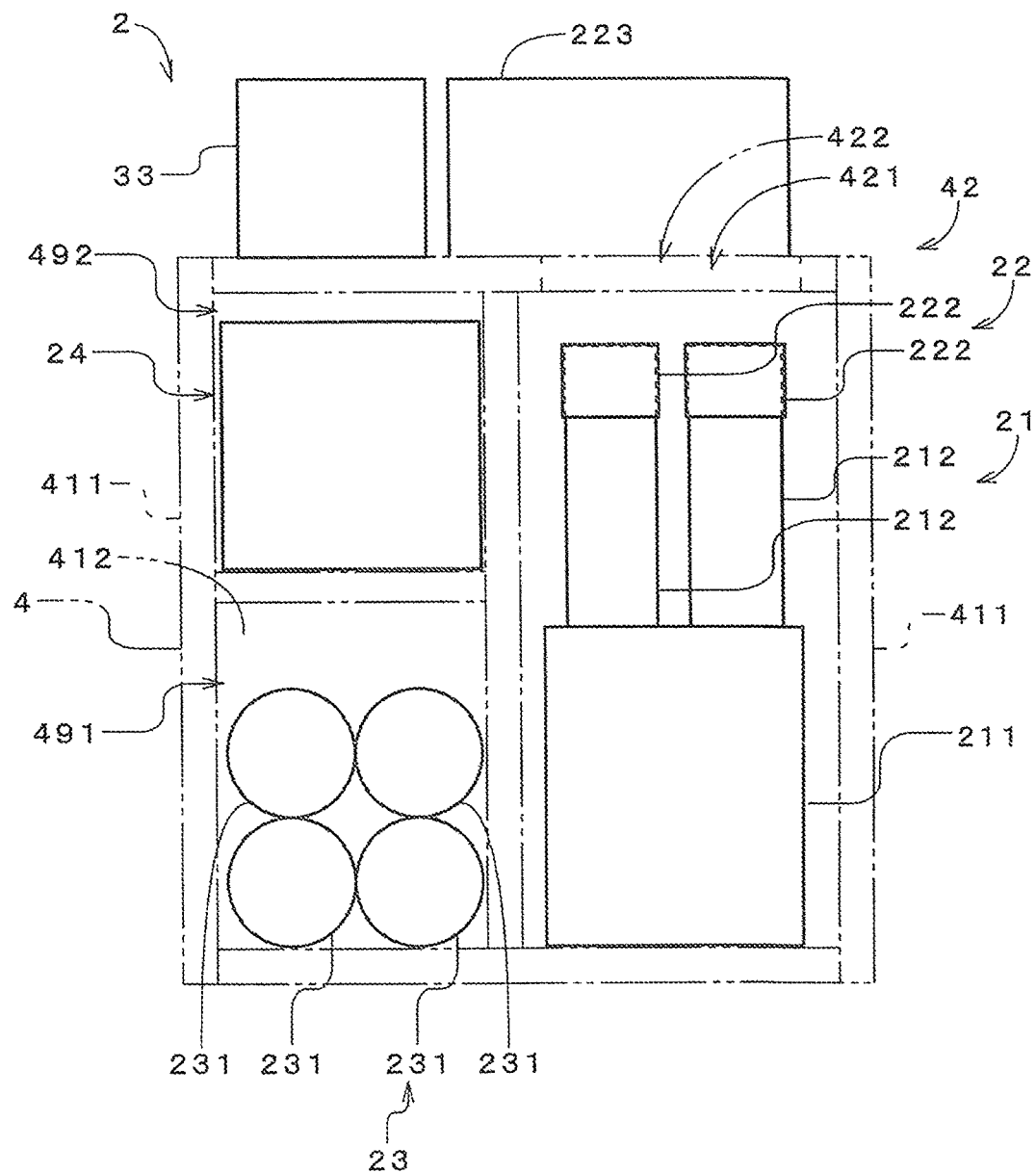
FIG. 7 is a side view of the gas supply system.
Figure 8:
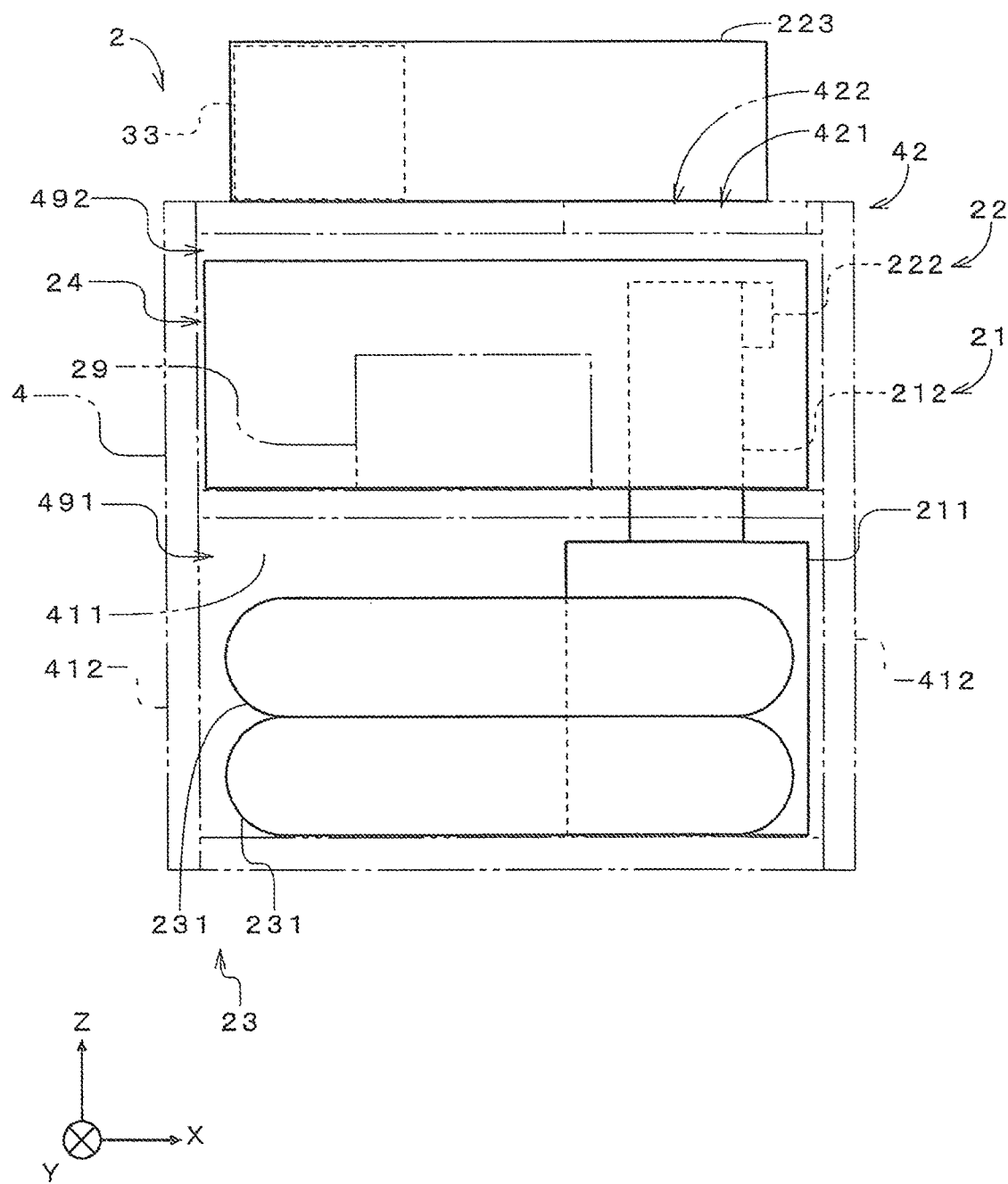
FIG. 8 is a side view of the gas supply system.

FIG. 7 is a side view of the gas supply system 2. FIG. 8 is a view of the gas supply system 2 when viewed from a left side of FIG. 7. In FIGS. 7 and 8, the housing 4 is shown by chain double-dashed line. Further, only main devices of the gas supply system 2 are shown and peripheral members such as pipes are not shown. In FIGS. 7 and 8, the brine pump 241 of the pre-cooling system 24 and the evaporator 31 of the refrigerator 3 shown in FIG. 1 and the refrigerant compressor 32 and the expander 34 shown in FIG. 6 are shown by one rectangle denoted by 24.

The housing 4 has a rectangular parallelepiped shape. An opening 421 is formed on a top portion 42 of the housing 4. The opening 421 is closed by an openable and closable lid portion 422. In the housing 4, the accumulator unit 23 is arranged laterally adjacent to the compressor unit 21 in a Y direction (i.e. a lateral direction of FIG. 7 and a direction perpendicular to the plane of FIG. 8). A part of the pre-cooling system 24 is arranged above the accumulator unit 23. In the following description, the Y direction in which the compressor unit 21 and the accumulator unit 23 are arranged is called an "arrangement direction". An X direction is a direction perpendicular to the arrangement direction in a horizontal plane (i.e. a direction perpendicular to the plane of FIG. 7 and a lateral direction of FIG. 8). A Z direction is perpendicular to the X and Y directions and coincides with a gravity direction. Hereinafter, the Z direction is referred to as a "vertical direction".

The compressor unit 21 and the accumulator unit 23 are explosion-proof. A part 491 of the interior of the housing 4 where the compressor unit 21 and the accumulator unit 23 are arranged is called an "explosion-proof portion 491" below. Note that electric devices and instrumentation attached to the compressor unit 21 and the accumulator unit 23 are also explosion-proof in the explosion-proof portion 491. On the other hand, the pre-cooling system 24 is not explosion-proof. A part 492 of the interior of the housing 4 where the pre-cooling system 24 is arranged is called a "non-explosion-proof portion 492". As shown in FIG. 8, the control unit 29 is arranged in the non-explosion-proof portion 492. In the non-explosion-proof portion 492, electric devices and instrumentation attached to the pre-cooling system 24 and the control unit 29 are also not explosion-proof. Unillustrated gas detection sensors are arranged in the explosion-proof portion 491 and the non-explosion-proof portion 492 shown in FIGS. 7 and 8 to control the leakage of the hydrogen gas in the housing 4.

The compressor unit 21 is of a so-called vertical installation type and the compressors 212 are arranged in the housing 4 while being located above the driver 211 in the vertical direction. Specifically, the pistons vertically reciprocate in the cylinders in the compressors 212. In the vertical direction, the entire compressors 212 overlap the opening 421. This enables the parts such as the compressors 212 to be easily taken out to the outside of the housing 4 through the opening 421 by opening the lid portion 422 when maintenance is carried out for the compressor unit 21. Note that the heat exhauster 223 and the condenser 33 are spaced from the opening 421. In the gas supply system 2, the compressors 212 may partly overlap the opening 421 in the vertical direction or the entire compressors 212 may overlap the opening 421 if a desired part of the compressor unit 21 can be taken out.

In the accumulator unit 23, two of the four accumulators 231 are arranged in the arrangement direction and the remaining two accumulators 231 vertically overlap the above two accumulators 231. Each accumulator 231 extends along side portions 411 having surfaces substantially perpendicular to the arrangement direction, i.e. surface whose normals are parallel to the arrangement direction out of four side portions 411, 412 of the housing 4 perpendicularly standing up with respect to an installation surface. The side portions 411 are referred to as "first side portions 411" below. Further, two side portions 412 having surfaces parallel to the arrangement direction, i.e. surfaces perpendicular to an extending direction of the accumulators 231 are referred to as "second side portions 412".

The gas coolers 222 of the gas cooling unit 22 are fixed to the compressors 212 of the compressor unit 21 in the explosion-proof portion 491. Further, the cooling water pump 221 (see FIG. 2) is also arranged in the explosion-proof portion 491. The gas coolers 222 and the cooling water pump 221 are explosion-proof. The heat exhauster 223 is arranged on the top portion 42 of the housing 4.

In the pre-cooling system 24, the brine pump 241 and the evaporator 31 of the refrigerator 3 shown in FIG. 1 and the refrigerant compressor 32 and the expander 34 shown in FIG. 6 are arranged in the non-explosion-proof portion 492. The condenser 33 is arranged on the top portion 42 of the housing 4. Note that the pre-cooling heat exchanger 242 is arranged near the dispenser 11 of FIG. 1. The pre-cooling heat exchanger 242 may be arranged in the dispenser 11. Since the air-cooled heat exhauster 223 and condenser 33 are utilized in the gas supply system 2, a degree of freedom in installation position is improved as compared to water-cooled ones and the top portion 42 of the housing 4 can be effectively utilized.

As described above, the compressor unit 21, the gas cooling unit 22, the accumulator unit 23 and each device of the pre-cooling system 24 except the pre-cooling heat exchanger 242 are provided in the housing 4 or on the top portion 42 of the housing 4. Thus, the gas supply system 2 can be small in size.

The hydrogen station 10 including the gas supply system 2 according to the first embodiment of the present invention has been described above. In the gas supply system 2, the compressor unit 21 is vertically arranged in the housing 4 and the pre-cooling system 24 is arranged above the accumulator unit 23. As compared to a gas supply system of a so-called horizontal installation type in which a compressor unit is arranged in a horizontal plane, an area occupied by the compressor unit 21 can be reduced. By covering the compressor unit 21 and the accumulator unit 23 by one rectangular parallelepiped housing 4, a space (non-explosion-proof portion 492 in this embodiment) is formed above the accumulator unit 23. Thus, at least a part of the pre-cooling system 24 can be arranged in this space. In this way, the installation area of the gas supply system 2 can be reduced and the hydrogen station 10 can be reduced in size.

Particularly, since the pre-cooling heat exchanger 242 is a microchannel heat exchanger, it is possible to reduce the pre-cooling heat exchanger 242 in size while ensuring hydrogen gas cooling efficiency. As a result, the other devices of the pre-cooling system 24 can also be reduced in size. In this way, many devices of the pre-cooling system 24 can be arranged in the housing 4 and the installation area of the gas supply system 2 can be reduced.

Further, since the gas coolers 222 are also small-size microchannel heat exchangers, the installation area of the gas supply system 2 can be further reduced by directly fixing the gas coolers 222 to the compressors 212 of the compressor unit 21. Since the heat exhauster 223 of the gas cooling unit 22 and the condenser 33 of the refrigerator 3 are arranged on the top portion 42 of the housing 4, the installation area of the gas supply system 2 can be further reduced as compared to the case where these members are arranged not in or on the housing 4.

In the accumulator unit 23, two of the four accumulators 231 are arranged in each of upper and lower stages. A width of the accumulator unit 23 in the arrangement direction can be suppressed as compared to the case where the four accumulators 231 are laterally arranged in parallel, and a vertical height can be suppressed as compared to the case where the four accumulators 231 are vertically arranged one above another. As just described, in the gas supply system 2, it is possible to ensure the number of the accumulators 231 while suppressing the size of the accumulators 231. Further, since a longitudinal direction of the accumulators 231 extends along the first side portions 411 of the housing 4, a width of the housing 4 in the arrangement direction can be prevented from becoming unnecessarily large and the installation area of the gas supply system 2 can be further reduced.

The non-explosion-proof portion 492 is formed in the housing 4. This can eliminate the need for making the pre-cooling system 24 and the control unit 29 explosion-proof and can prevent the enlargement of these devices and drastically suppress cost.

Figure 9:
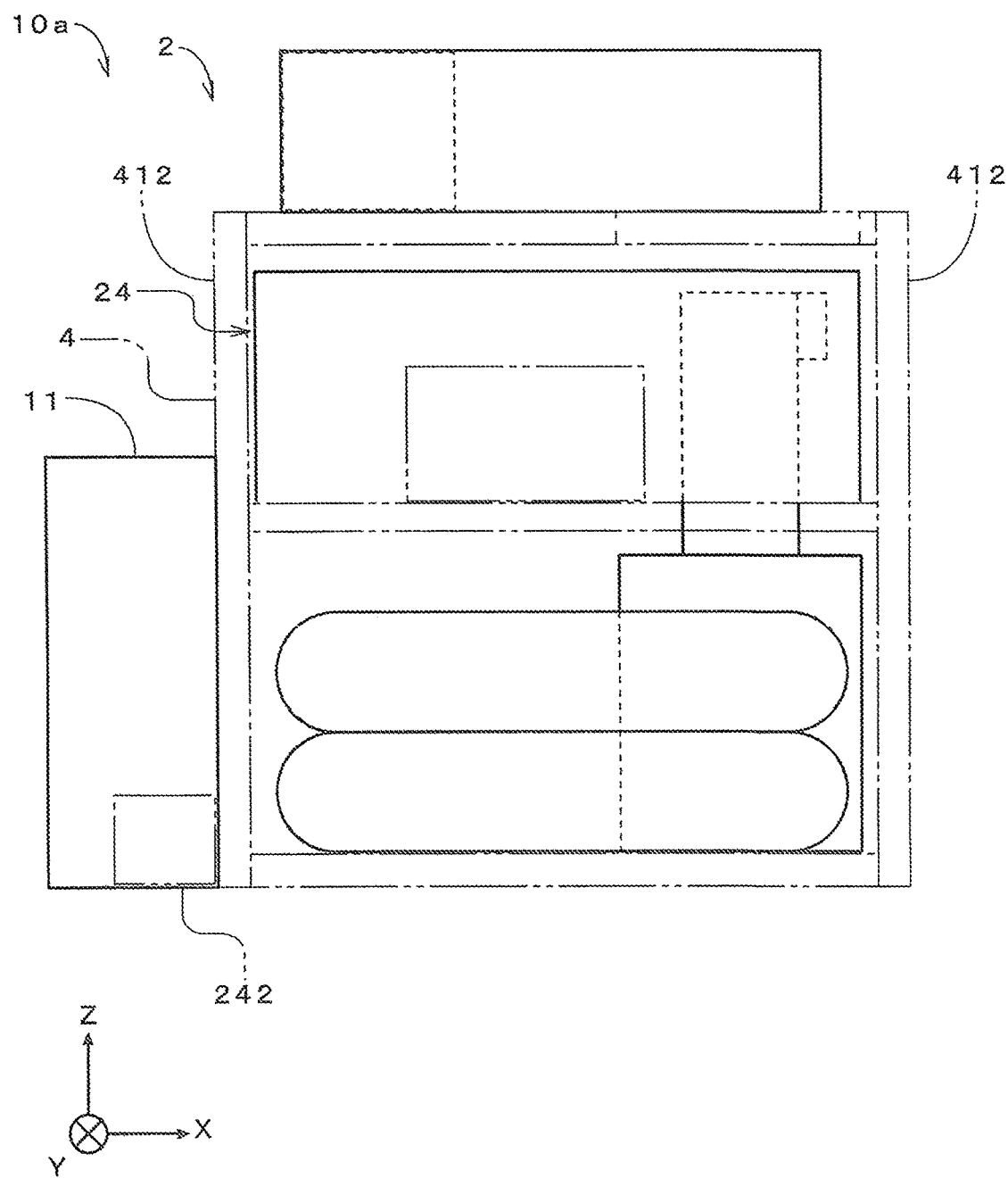
FIG. 9 is a diagram showing a hydrogen station according to another example.

FIG. 9 is a diagram showing a part of a hydrogen station 10a according to another example of the first embodiment. The dispenser 11 is attached to one of the second side portions 412 having the surface parallel to the arrangement direction of the housing 4. The pre-cooling heat exchanger 242 of the pre-cooling system 24 is arranged in the dispenser 11. In a structure shown in FIG. 9, the dispenser 11 is attached to the gas supply system 2, whereby the entire hydrogen station 10a can be reduced in size. In the hydrogen station 10a, the dispenser 11 may be slightly spaced from the second side portion 412 as long as it is arranged adjacent to the second side portion 412.

Although the first embodiment of the present invention has been described above, the present invention is not limited to the above first embodiment and various changes are possible.

In the hydrogen station 10a shown in FIG. 9, the pre-cooling heat exchanger 242 may be arranged in the housing 4. Further, the pre-cooling heat exchanger 242 can be arranged in the housing 4 also in the gas supply system 2 shown in FIG. 1. In this case, the compressor unit 21, the gas cooling unit 22 and the accumulator unit 23 and all the devices of the pre-cooling system 24 are arranged in the housing 4 or on the top portion 42 of the housing 4. A cover for covering the heat exhauster 223 and the condenser 33 may be mounted on the top portion 42, so that all the devices are arranged in the housing 4.

The gas coolers 222 may be plate heat exchangers other than microchannel heat exchangers if they are directly fixed to the compressors 212. In the accumulator unit 23, the number of the accumulators 231 needs not necessarily be four. The number of the accumulators 231 may be three if a high flow rate of the hydrogen gas is not required in the low-pressure region of the tank of the vehicle 9. Further, the number of the accumulators 231 may be five or more if a sufficient arrangement space is ensured in the explosion-proof portion 491. In the case of using short accumulators 231, one accumulator group may be formed by a plurality of accumulators 231 and a plurality of accumulator groups may be arranged in the longitudinal direction of the accumulators 231, i.e. in a direction perpendicular to the arrangement direction in a horizontal plane.

Cooling fluid other than water may be used in the gas cooling unit 22. The cooling water pump 221 may be arranged on the top portion 42 of the housing 4. In the hydrogen station 10a, the dispenser 11 may be arranged adjacent to the first side portion 411.

The gas supply system 2 may be utilized to fill the hydrogen gas into tank-mounted apparatuses other than vehicles. The gas supply system 2 may be used to supply gas other than hydrogen gas.

Here, the above first embodiment is summarized.

The first embodiment is directed to a gas supply system for supplying gas to filling equipment for filling gas into a tank-mounted apparatus, including a compressor unit including a driver and a compressor configured to compress the gas by being driven by the driver, an accumulator unit including a plurality of accumulators and configured to store the gas discharged from the compressor unit, a pre-cooling system configured to cool the gas flowing into the filling equipment from the accumulator unit and a rectangular parallelepiped housing configured to house at least a part of the pre-cooling system, the compressor unit and the accumulator unit, wherein the compressor unit is arranged with the compressor located above the driver and the at least the part of the pre-cooling system is arranged above the accumulator unit on a side of the compressor unit in the housing.

In this gas supply system, an installation area can be reduced.

The plurality of accumulators of the gas supply system may extend along a side portion of the housing having a surface substantially perpendicular to an arrangement direction in which the compressor unit and the accumulator unit are arranged. In this mode, the installation area can be further reduced.

The gas supply system may further include a gas cooler fixed to the compressor and configured to exchange heat of the gas discharged from the compressor and heat of cooling fluid. In this case, the gas cooler may be a laminated body in which a plurality of gas flow paths in which the gas flows and a plurality of cooling flow paths in which the cooling fluid flows are alternately laminated. In this mode, the installation area can be further reduced.

The gas supply system may be provided with a heat exhauster arranged on a top portion of the housing and configured to cool the cooling fluid by the flow of air. In this mode, the installation area can be further reduced.

In the gas supply system, the pre-cooling system may include a brine circuit configured to cool the gas flowing in the filling equipment using brine and a refrigerator configured to cool the brine. Further, the refrigerator may include an evaporator configured to cool the brine by evaporating a refrigerant, a refrigerant compressor configured to compress the refrigerant flowing out from the evaporator, a condenser configured to condense the refrigerant compressed by the refrigerant compressor by a flow of air and an expander configured to expand the refrigerant flowing out from the condenser. Further, the evaporator, the refrigerant compressor and the expander may be arranged in the housing and the condenser may be arranged on the top portion of the housing. Since the condenser is structured to condense the refrigerant by air cooling in this mode, the condenser can be arranged on the top portion of the housing and the installation area can be further reduced.

The top portion of the housing of the gas supply system may include an opening. In this case, the compressor unit may overlap the opening in a vertical direction. In this mode, maintenance for the compressor unit can be easily carried out.

The accumulator unit of the gas supply system may be formed of four accumulators, two each of which are arranged in each of upper and lower stages. In this mode, it is possible to ensure the number of the accumulators while suppressing the size of the accumulator unit.

In the gas supply system, two out of the four accumulators may be used in a low-pressure region of a tank in the tank-mounted apparatus, another one may be used in a medium-pressure region and still another one may be used in a high-pressure region when the filling equipment fills the gas into the tank-mounted apparatus. In this mode, the gas can be efficiently supplied to the tank-mounted apparatus.

In the gas supply system, the compressor unit and the accumulator unit may be explosion-proof, the pre-cooling system may be non-explosion-proof, and the at least the part of the pre-cooling system in the housing may be arranged in a non-explosion-proof portion. Further, a control unit may be further provided which controls the compressor unit, the accumulator unit and the pre-cooling system. In this mode, the control unit and the pre-cooling system can be reduced in size and cost can be reduced.

The first embodiment is directed to a hydrogen station with filling equipment and a gas supply system configured to supply hydrogen gas to the filling equipment, wherein the filling equipment fills the hydrogen gas into a tank-mounted apparatus.

In the hydrogen station, the filling equipment may be arranged adjacent to a side portion of the housing. In this mode, an installation area of the entire system including the gas supply system and the filling equipment can be reduced.

Second Embodiment

A gas supply system 2 according to a second embodiment of the present invention is described. Here, only configurations different from the first embodiment are described and the same configurations as the first embodiment are not described. Note that FIGS. 1 to 6 are also used as views and diagrams showing the supply system according to the second embodiment.

Figure 10:
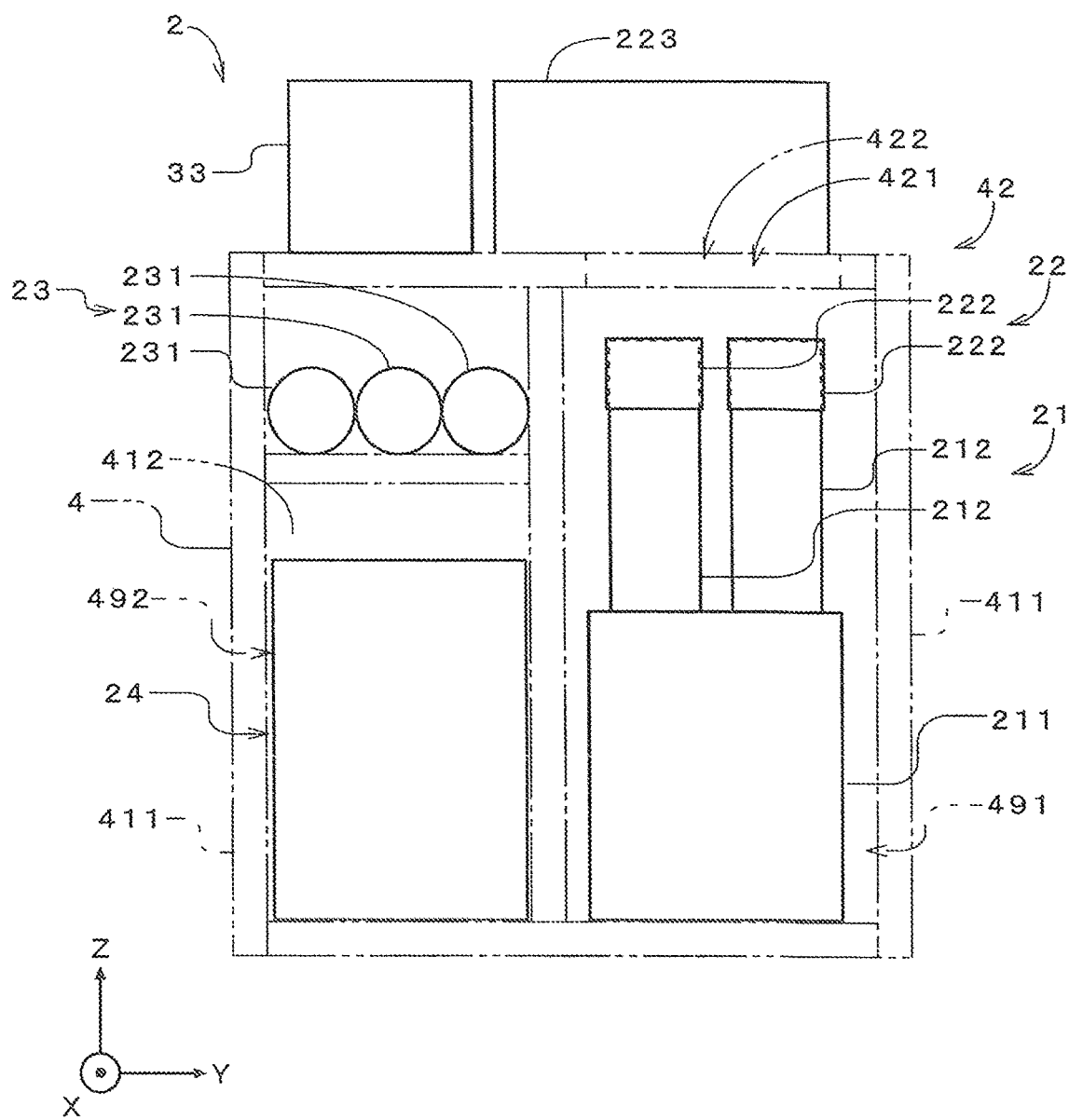
FIG. 10 is a side view of a gas supply system according to a second embodiment of the present invention.
Figure 11:
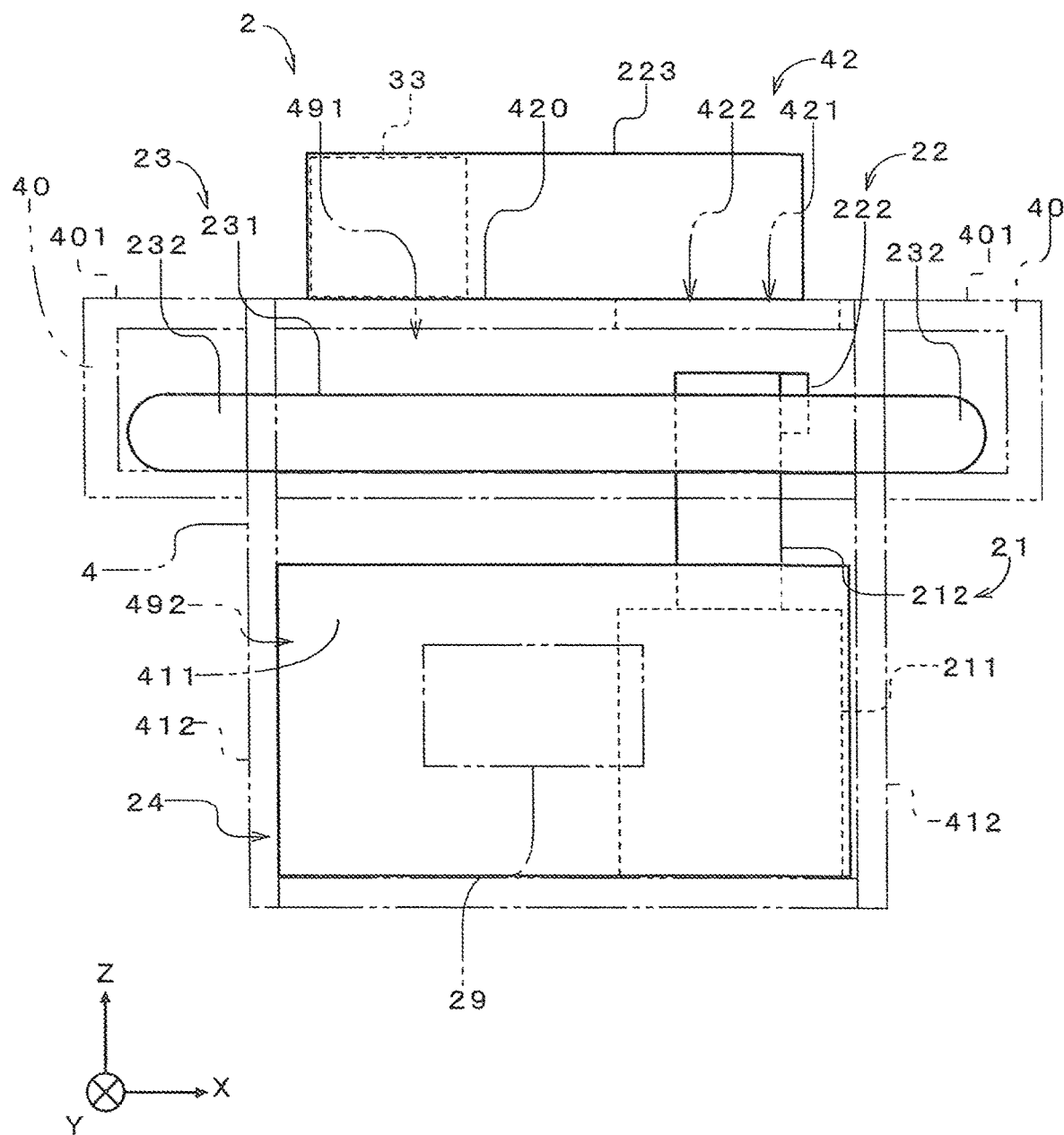
FIG. 11 is a side view of the gas supply system according to the second embodiment of the present invention.

FIG. 10 is a side view of the gas supply system 2. FIG. 11 is a view of the gas supply system 2 when viewed from a left side of FIG. 10. In FIGS. 10 and 11, a housing 4 is shown by chain double-dashed line. Further, only main devices of the gas supply system 2 are shown and peripheral members such as pipes are not shown. In FIGS. 10 and 11, a brine pump 241 of a pre-cooling system 24 and an evaporator 31 of a refrigerator 3 shown in FIG. 1 and a refrigerant compressor 32 and an expander 34 shown in FIG. 6 are shown by one rectangle denoted by 24.

The housing 4 has a rectangular parallelepiped shape. An opening 421 is formed on a top portion 42 of the housing 4 and closed by an openable and closable lid portion 422. In the housing 4, an accumulator unit 23 and a part of the pre-cooling system 24 is arranged laterally adjacent to a compressor unit 21 in a Y direction (i.e. a lateral direction of FIG. 10 and a direction perpendicular to the plane of FIG. 11). The accumulator unit 23 is located above a bottom part of the housing 4 and the pre-cooling system 24 is located below the accumulator unit 23.

In the accumulator unit 23, three accumulators 231 are arranged in parallel in an arrangement direction in a horizontal plane. Each accumulator 231 extends along side portions 411 having surfaces substantially perpendicular to the arrangement direction, i.e. surface whose normals are parallel to the arrangement direction out of four side portions 411, 412 of the housing 4 perpendicularly standing up with respect to an installation surface. The side portions 411 are referred to as "first side portions 411" below. Further, two side portions 412 having surfaces parallel to the arrangement direction, i.e. surfaces perpendicular to an extending direction of the accumulators 231 are referred to as "second side portions 412".

As shown in FIG. 11, each accumulator 231 includes two projecting portions 232 projecting from the two second side portions 412 of the housing 4. Cover members 40 for respectively covering the projecting portions 232 are mounted on the two side portions 412 of the housing 4. Note that the cover members 40 may be regarded as parts of the housing 4. Upper surfaces 401 of the cover members 40 are flush with an upper surface 420 of the housing 4. On the housing 4, unillustrated operation door(s) is/are disposed below one or both of the cover members 40. By opening the operation door(s), maintenance is carried out for the pre-cooling system 24 and the compressor unit 21.

As shown in FIGS. 10 and 11, gas coolers 222 of a gas cooling unit 22 are fixed to compressors 212 of the compressor unit 21 in an explosion-proof portion 491. Further, a cooling water pump 221 (see FIG. 2) is also arranged in the explosion-proof portion 491 although not shown in FIGS. 10 and 11. The gas coolers 222 and the cooling water pump 221 are explosion-proof. A heat exhauster 223 is arranged on the top portion 42 of the housing 4. Since the air-cooled heat exhauster 223 is utilized in the gas supply system 2, a degree of freedom in installation position is improved as compared to the water-cooled one and the top portion 42 of the housing 4 can be effectively utilized.

In the pre-cooling system 24, the brine pump 241 and the evaporator 31 of the refrigerator 3 shown in FIG. 1 and the refrigerant compressor 32 and the expander 34 shown in FIG. 6 are arranged in a non-explosion-proof portion 492 shown in FIGS. 10 and 11. These devices are located below the accumulator unit 23. If a brine circuit 5 is provided with a brine tank, the brine tank may be arranged below the accumulator unit 23 in the housing 4. A condenser 33 is arranged on the top portion 42 of the housing 4. Since the condenser 33 is also air-cooled similarly to the heat exhauster 223 of the gas cooling unit 22, a degree of freedom in installation position is improved and the top portion 42 of the housing 4 can be effectively utilized. A pre-cooling heat exchanger 242 of the brine circuit 5 shown in FIG. 1 is arranged near a dispenser 11 outside the housing 4. Note that the pre-cooling heat exchanger 242 can also be arranged in the dispenser 11.

As described above, the compressor unit 21, the gas cooling unit 22, the accumulator unit 23 and each device of the pre-cooling system 24 except the pre-cooling heat exchanger 242 are provided in the housing 4 or on the top portion 42 of the housing 4.

The hydrogen station 10 including the gas supply system 2 according to the second embodiment of the present invention has been described above. In the gas supply system 2, the compressor unit 21, the accumulator unit 23 and the pre-cooling system 24 (however, except the pre-cooling heat exchanger 242 and the condenser 33) as main devices are arranged in the housing 4, and the pre-cooling system 24 is arranged below the accumulator unit 23 in the housing. In this way, the installation area of the gas supply system 2 can be reduced and the hydrogen station 10 can be reduced in size. Further, by vertically arranging the compressor unit 21 in the housing 4, the installation area can be further reduced.

In the accumulator unit 23, the three accumulators 231 are arranged in parallel in the arrangement direction, whereby it is possible to install the accumulators 231 while suppressing a height of the gas supply system 2. Since a longitudinal direction of the accumulators 231 extends along the first side portions 411 of the housing 4, a width of the housing 4 in the arrangement direction can be prevented from becoming unnecessarily large and the installation area of the gas supply system 2 can be further reduced. Further, by arranging the accumulators 231 in parallel in the horizontal direction, water can be efficiently sprayed to all the accumulators 231 when the accumulators 231 increase in temperature.

In the gas supply system 2, the accumulators 231 include the projecting portions 232, whereby a sufficient volume of the accumulators 231 can be ensured without enlarging the installation area of the gas supply system 2.

Since the upper surfaces 401 of the cover members 40 are flush with the upper surface 420 of the housing 4, an area of the top portion 42 of the housing 4 can be increased to increase an installation area for the condenser 33 and the heat exhauster 223 and widen an operation space.

In the gas supply system 2, since the pre-cooling system 24 having a higher maintenance frequency than the accumulator unit 23 is arranged in a lower part of the gas supply system 2, a workload of an operator is reduced.

Since the pre-cooling system 24 and the control unit 29 are provided in the non-explosion-proof portion 492 in the housing 4, the enlargement of the gas supply system 2 caused by making these devices explosion-proof is prevented and cost is drastically reduced.

Figure 12:
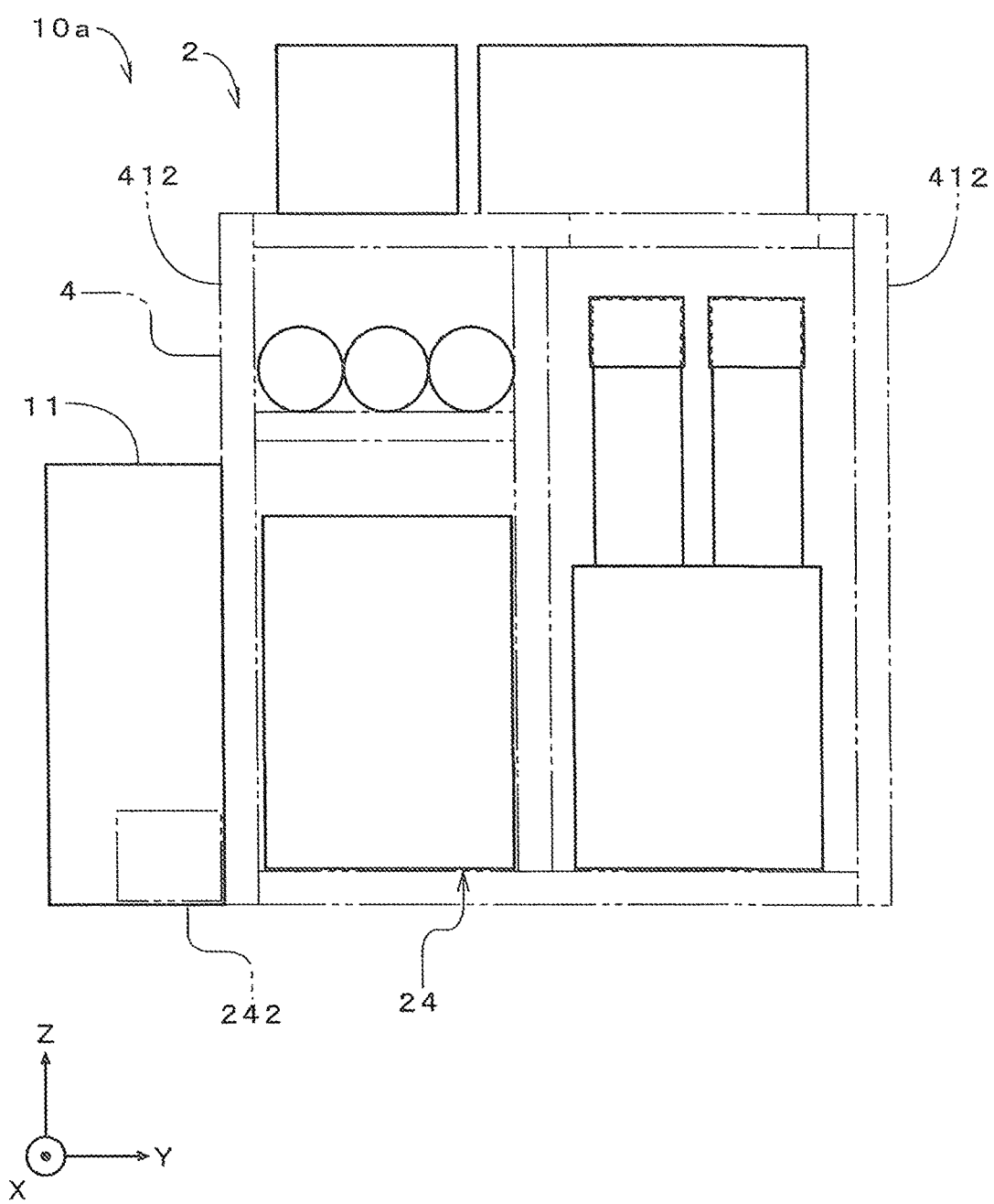
FIG. 12 is a diagram showing a hydrogen station according to another example of the second embodiment of the present invention.

FIG. 12 is a diagram showing a part of a hydrogen station 10a according to another example of the second embodiment. The dispenser 11 is mounted on one of the second side portions 412 having the surface parallel to the arrangement direction of the housing 4. The pre-cooling heat exchanger 242 of the pre-cooling system 24 is arranged in the dispenser 11. In a structure shown in FIG. 12, the dispenser 11 is attached to the gas supply system 2, whereby the entire hydrogen station 10a can be reduced in size. In the hydrogen station 10a, the dispenser 11 may be slightly spaced from the second side portion 412 as long as it is arranged adjacent to the second side portion 412.

Figure 13:
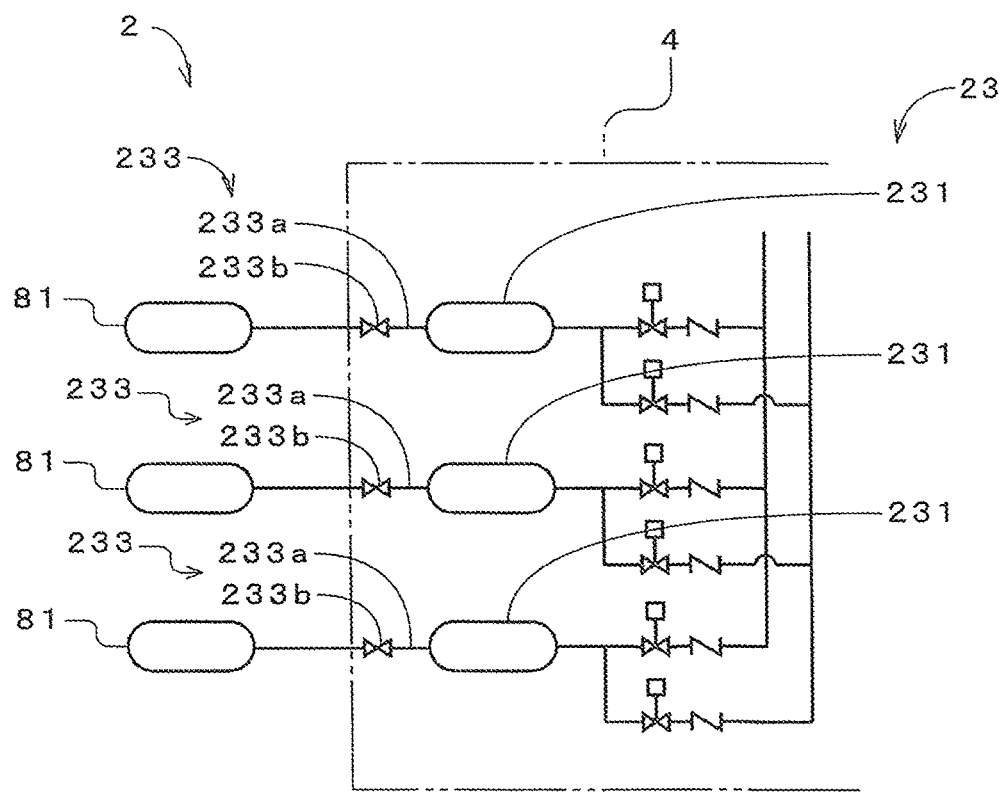
FIG. 13 is a diagram showing a gas supply system according to another example of the second embodiment of the present invention.

FIG. 13 is a diagram showing still another example of the gas supply system 2 according to the second embodiment. The accumulator unit 23 includes connecting portions 233 attached to rear parts (i.e. end parts opposite to discharging portions for the hydrogen gas) of the accumulators 231. The connecting portion 233 includes a take-out pipe 233a and a closing valve 233b and is arranged in the housing 4. The accumulator 231 is connectable in series to another accumulator 81 for extension via the connecting portion 233. The accumulator 81 is referred to as an "extension accumulator 81" below. The connecting portions 233 are provided in the cover member 40 shown in FIG. 11. The extension accumulators 81 are preferably arranged below the cover member 40. In this way, a distance between the accumulators 231 and the extension accumulators 81 can be shortened. When the extension accumulators 81 are connected to the gas supply system 2 as shown in FIG. 13, hydrogen gas in the extension accumulator 81 is fed to the corresponding accumulator 231 if the amount of the hydrogen gas in the accumulator 231 decreases.

In the gas supply system 2, the accumulators 81 can be easily added by providing the connecting portions 233 and a storage amount of the hydrogen gas in the hydrogen system 10 can be increased. As a result, the hydrogen gas can be quickly supplied to many vehicles 9. By connecting the extension accumulators 81 in series to the accumulators 231, it is prevented that a flow rate control of the hydrogen gas becomes complicated as compared to the case where the extension accumulators 81 are connected at intermediate positions of flow paths between the accumulators 231 and the dispenser 11 (see FIG. 1).

Figure 14:
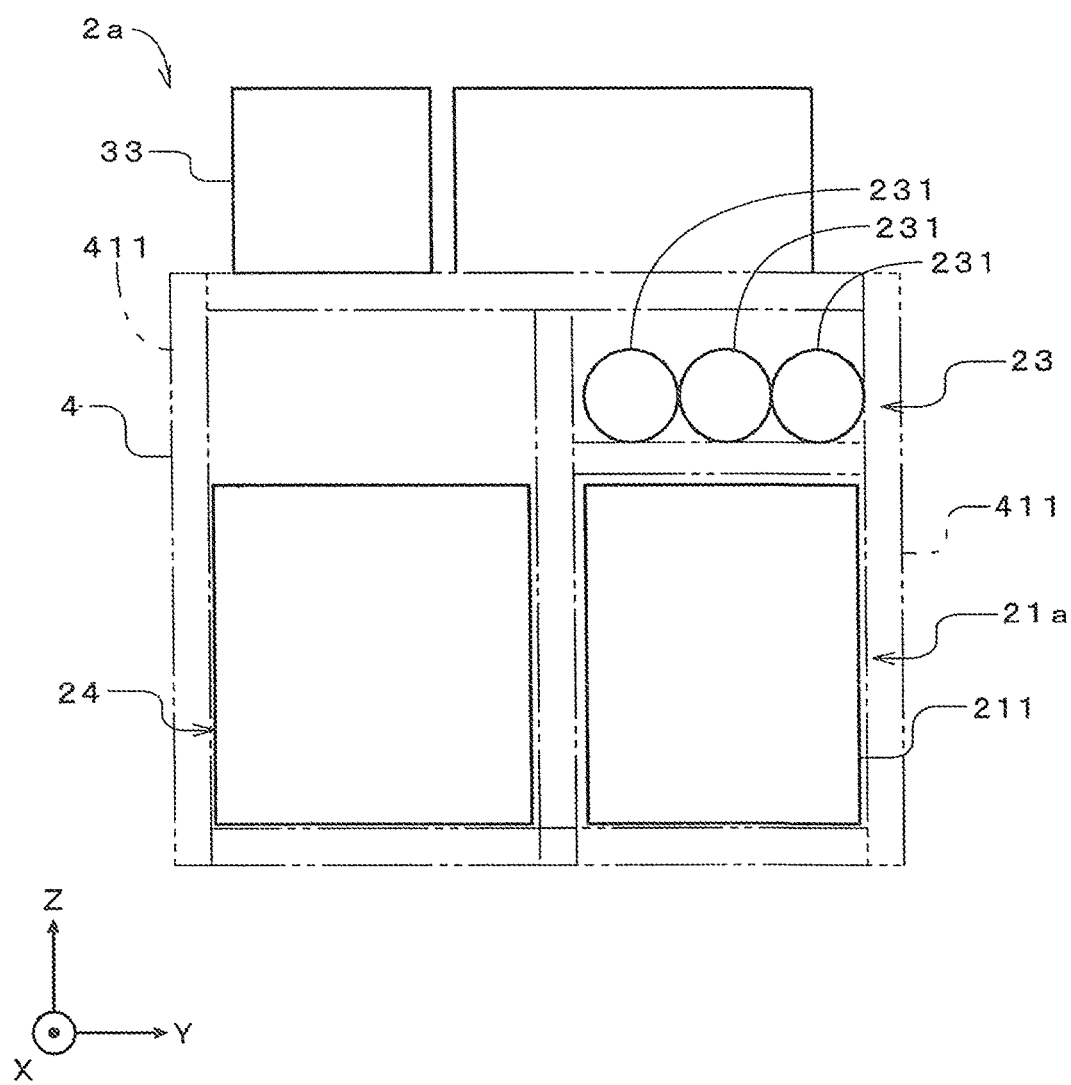
FIG. 14 is a diagram showing a gas supply system according to another example of the second embodiment.

FIG. 14 is a diagram showing a gas supply system 2a according to further another example of the second embodiment. In the gas supply system 2a, an accumulator unit 23 is located above a compressor unit 21a and a pre-cooling system 24 is located laterally to the compressor unit 21a in the Y direction. The compressor unit 21a is of a so-called horizontal installation type and compressors are arranged more backward with respect to the plane of FIG. 14 than a driver 211. The other structure of the gas supply system 2a is similar to that of the gas supply system 2 according to the second embodiment and similar components are described while being denoted by the same reference signs.

The accumulator unit 23 and the compressor unit 21a are arranged along a first side portion 411 of the housing 4 on a right side of FIG. 14. More precisely, a longitudinal direction of accumulators 231 of the accumulator unit 23 and a direction from a driver 211 of the compressor unit 21a toward the compressors are substantially parallel to a surface of the first side portion 411.

In the gas supply system 2a, the accumulator unit 23 is located above the compressor unit 21a, whereby an installation space of the gas supply system 2a can be reduced and a hydrogen system 10 can be reduced in size. By utilizing the compressor unit 21a having a short vertical height, an increase in the height of a housing 4 is prevented. Note that a diaphragm type compressor unit may be utilized as the compressor unit. The diaphragm type compressor unit may be vertically installed since a vertical height is suppressed as compared to piston type compressor units.

Although the second embodiment and its modifications have been described above, various changes are possible for the above second embodiment.

In the hydrogen station 10a shown in FIG. 12, the pre-cooling heat exchanger 242 may be arranged in the housing 4. Further, the pre-cooling heat exchanger 242 can be arranged in the housing 4 also in the gas supply system 2 shown in FIGS. 1 and 10. In this case, the compressor unit 21, the gas cooling unit 22, the accumulator unit 23 and all the devices of the pre-cooling system 24 are housed in the housing 4 or on the top portion 42 of the housing 4. A cover for covering the heat exhauster 223 and the condenser 33 may be mounted on the top portion 42, so that all the devices are arranged in the housing 4. The same holds also for the gas supply system 2a of FIG. 14.

In the above second embodiment, a piston type compressor unit of a horizontal installation type may be utilized or a diaphragm type compressor unit may be utilized. In this case, since a space is secured above the compressor unit 21, the evaporator 31, the refrigerant compressor 32 and the expander 34 of the refrigerator 3 may be arranged in this space. By arranging the compressor unit 21 for which maintenance is carried out with a higher frequency than the refrigerator 3 below the refrigerator 3, a workload in carrying out maintenance can be reduced. Further, in the case of providing the brine circuit 5 with a brine tank, the brine tank may be arranged below the accumulator unit 23. As just described, in the gas supply system 2, various devices of the pre-cooling system arranged in the housing 4 may be arranged either or both below the accumulator unit 23 or/and above the compressor unit 21.

In the above embodiment, the gas coolers 222 may be plate heat exchangers other than microchannel heat exchangers if they are directly fixed to the compressors 212. In the accumulator unit 23, the number of the accumulators 231 may be other than three. In the gas cooling unit 22, cooling fluid other than water may be used to cool the hydrogen gas. The cooling water pump 221 may be arranged on the top portion 42 of the housing 4. The gas supply systems 2, 2a may be utilized to fill the hydrogen gas into tank-mounted apparatuses other than vehicles. The gas supply systems 2, 2a may be used to supply gas other than hydrogen gas.

Figure 15:
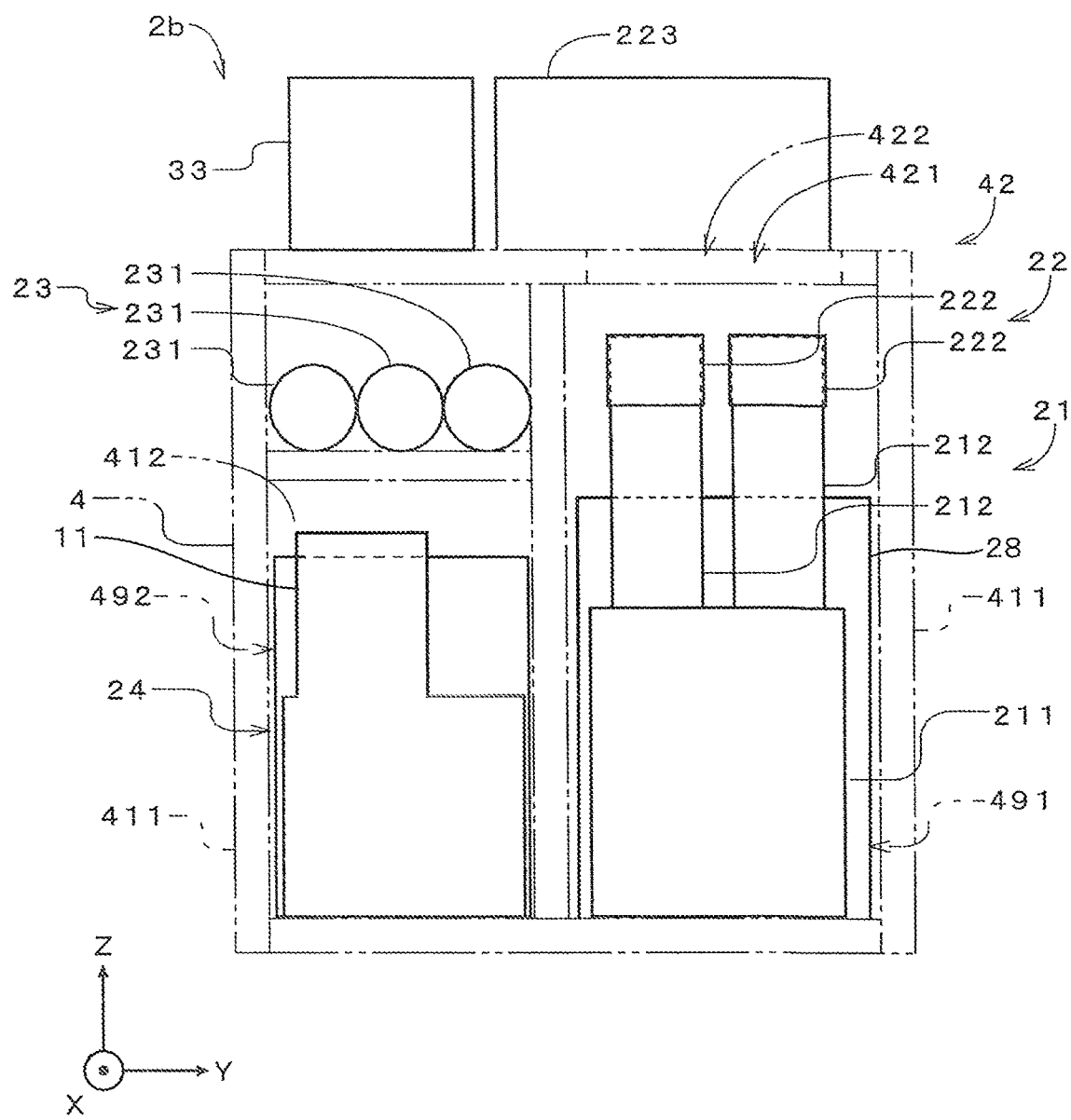
FIG. 15 is a side view showing a gas supply system according to another example of the second embodiment.
Figure 16:
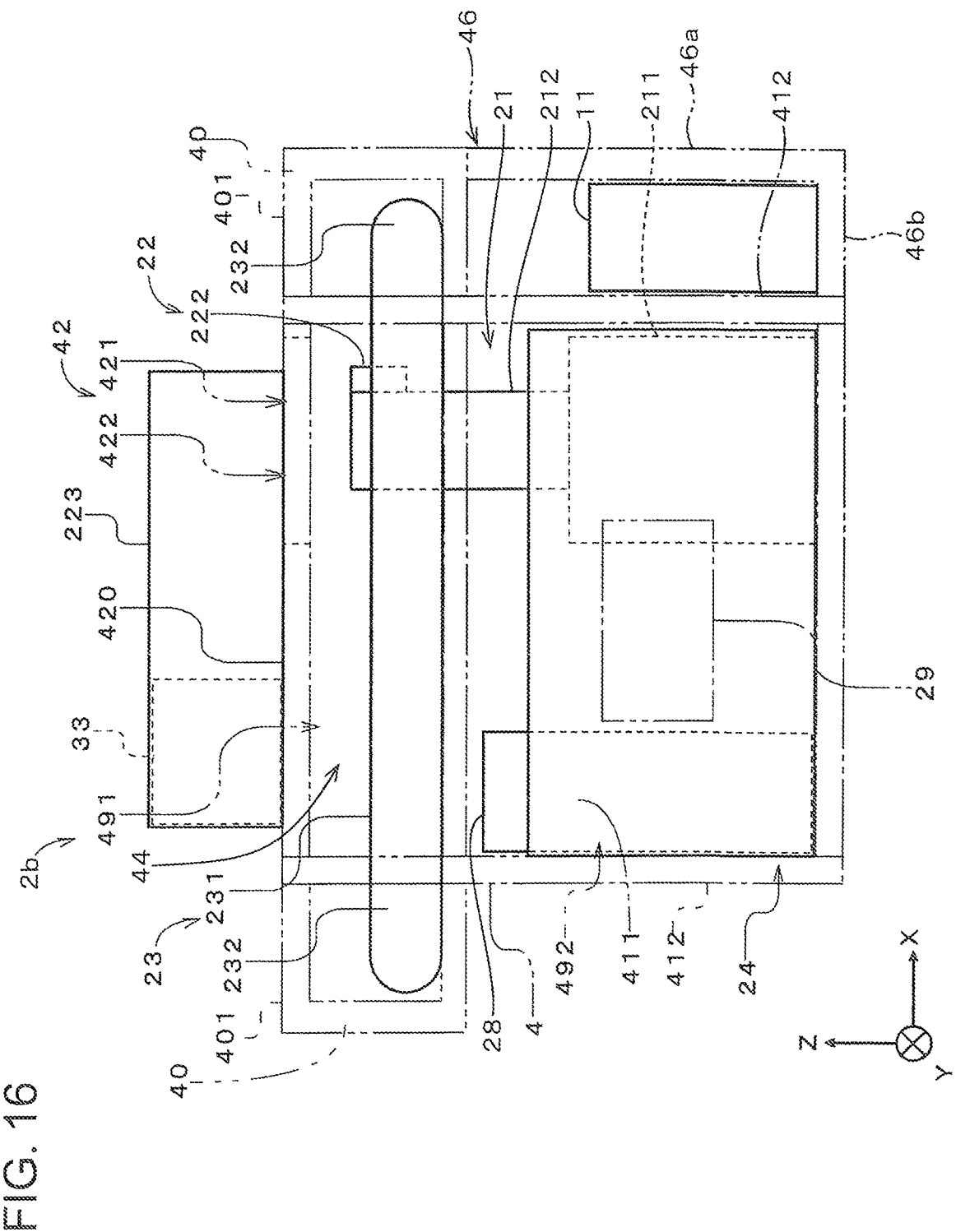
FIG. 16 is a side view showing a gas supply system according to another example of the second embodiment.

FIGS. 15 and 16 show a gas supply system 2b according to further another example of the second embodiment. In this gas supply system 2b, a dispenser 11 and a hydrogen receiving unit 28 are also arranged in a housing 4. Thus, the gas supply system 2b of this modification is configured as one package including the dispenser 11 and the hydrogen receiving unit 28.

In the gas supply system 2b according to the other example of the second embodiment, a compressor unit 21 is arranged near one end in the X direction (longitudinal direction of accumulator 231) in the housing 4 similarly to the gas supply system 2 of the second embodiment. The housing 4 is provided with cover members 40 on opposite sides in the X direction. An installing portion 46 for arranging the dispenser 11 is provided below the cover member 40 closer to the compressor unit 21. In other words, the housing 4 can be said to include a main body portion 44 between a pair of second side portions 412, the cover members 40 adjacent to upper parts of the second side portions 412 and the installing portion 46 located below one of the cover members 40. The installing portion 46 includes a vertical portion 46a extending downward from an outer end part of the cover member 40 and a bottom portion 46b extending in the X direction from a lower end part of the vertical portion 46a toward the second side portion 412. The dispenser 11 is located below an accumulator unit 23 and arranged on the bottom portion 46b.

On the other hand, as shown in FIG. 16, the hydrogen receiving unit 28 is arranged at a side opposite to the dispenser 11 with respect to the compressor unit 21 in the X direction. More specifically, the hydrogen receiving unit 28 is arranged in proximity to the second side portion 412 distant from the compressor unit 21 in the main body portion 44. Note that the hydrogen receiving unit 28 is located at a position displaced from the dispenser 11 and the accumulator unit 23 in the Y direction as shown in FIG. 15.

The hydrogen receiving unit 28 includes unillustrated pressure reducing valves and various instrumentation tools. The pressure reducing valve is for reducing the pressure of the hydrogen gas so that the hydrogen gas is received by a compressor 212 through a gas flow path 20 from outside, and arranged on a suction side of the compressor 212 in the gas flow path 20.

In this configuration, pipes for connecting the hydrogen receiving unit 28 and the compressor unit 21 and pipes for connecting the dispenser 11 and the compressor unit 21 can be prevented from becoming long.

Here, the second embodiment is summarized.

A gas supply system according to the second embodiment is directed to a gas supply system for supplying gas to filling equipment for filling gas into a tank-mounted apparatus, including a compressor unit including a driver and a compressor configured to compress the gas by being driven by the driver, a accumulator unit including a plurality of accumulators and configured to store the gas discharged from the compressor unit, a pre-cooling system configured to cool the gas flowing into the filling equipment from the accumulator unit and a rectangular parallelepiped housing configured to house at least a part of the pre-cooling system, the compressor unit and the accumulator unit. The accumulator unit is located laterally to the compressor unit and the at least the part of the pre-cooling system is located at least either below the accumulator unit or above the compressor unit.

According to this gas supply system, an installation area of the gas supply system can be reduced.

A gas supply system according to the second embodiment is directed to a gas supply system for supplying gas to filling equipment for filling gas into a tank-mounted apparatus, including a compressor unit including a driver and a compressor configured to compress the gas by being driven by the driver, a accumulator unit including a plurality of accumulators and configured to store the gas discharged from the compressor unit, a pre-cooling system configured to cool the gas flowing into the filling equipment from the accumulator unit and a rectangular parallelepiped housing configured to house at least a part of the pre-cooling system, the compressor unit and the accumulator unit. The accumulator unit is located above the compressor unit, and the accumulator unit and the compressor unit extend along one side portion of the housing.

According to this gas supply system, an installation area of the gas supply system can be reduced.

In the gas supply system, the accumulator unit may be located above a bottom portion of the housing. In this case, each of the plurality of accumulators may include a projecting portion projecting from the housing. In this way, it is possible to ensure a sufficient volume of the accumulators while suppressing the installation area of the gas supply system.

The gas supply system may further include a cover member for covering the projecting portions. In this case, an upper surface of the cover member may be flush with that of the housing. In this way, an area of a top portion of the gas supply system can be increased.

In the gas supply system, the plurality of accumulators may be arranged in parallel in a horizontal plane. In this way, it is possible to provide many accumulators while suppressing a height of the gas supply system.

In the gas supply system, the accumulator unit may further include connecting portions provided for the respective plurality of accumulators. In this case, the plurality of accumulators may be respectively connectable to other accumulators via the connecting portions. In this way, a storage amount of the gas can be increased.

The gas supply system may further include a gas cooler fixed to the compressor and configured to exchange heat of the gas discharged from the compressor and heat of cooling fluid. In this case, the gas cooler may be a laminated body in which a plurality of gas flow paths in which the gas flows and a plurality of cooling flow paths in which the cooling fluid flows are alternately laminated. In this way, the installation area can be further reduced.

The gas supply system may include a heat exhauster arranged on the top portion of the housing and configured to cool the cooling fluid by the flow of air. In this way, the installation area can be further reduced.

In the gas supply system, the pre-cooling system may include a brine circuit configured to cool the gas flowing in the filling equipment using brine and a refrigerator configured to cool the brine, the refrigerator may include an evaporator configured to cool the brine by evaporating a refrigerant, a refrigerant compressor configured to compress the refrigerant flowing out from the evaporator, a condenser configured to condense the refrigerant compressed by the refrigerant compressor by the flow of air and an expander configured to expand the refrigerant flowing out from the condenser, the evaporator, the refrigerant compressor and the expander may be arranged in the housing and the condenser may be arranged on the top portion of the housing. Since the condenser is structured to condense the refrigerant by air cooling, the condenser can be arranged on the top portion of the housing and the installation area can be further reduced.

In the gas supply system, the plurality of accumulators may extend along a side portion of the housing having a surface substantially perpendicular to an arrangement direction in which the compressor unit and the accumulator unit are arranged. In this way, the installation area can be further reduced.

In the gas supply system, the top portion of the housing may include an opening and the compressor unit may overlap the opening in a vertical direction. In this way, maintenance for the compressor unit can be easily carried out.

In the gas supply system, the number of the plurality of accumulators may be three, one may be used in a low-pressure region of a tank in the tank-mounted apparatus, another one may be used in a medium-pressure region and still another one may be used in a high-pressure region when the filling equipment fills the gas into the tank-mounted apparatus. In this way, the gas can be efficiently supplied to the tank-mounted apparatus.

In the gas supply system, the compressor unit and the accumulator unit may be explosion-proof, the pre-cooling system may be non-explosion-proof, and the at least the part of the pre-cooling system in the housing may be arranged in a non-explosion-proof portion. Further, a control unit may be further provided which controls the compressor unit, the accumulator unit and the pre-cooling system. In this way, the control unit and the pre-cooling system can be reduced in size and cost can be reduced.

The gas supply system may include a receiving unit configured to receive the gas to be sucked into the compressor from outside. In this case, the filling equipment may be arranged at a side opposite to the receiving unit with respect to the compressor unit in a longitudinal direction of the accumulators. In this way, a pipe for connecting the receiving unit and the compressor unit and a pipe for connecting the filling equipment and the compressor can be prevented from becoming longer.

A hydrogen station according to the second embodiment includes filling equipment and a gas supply system configured to supply hydrogen gas to the filling equipment, wherein the filling equipment fills the hydrogen gas into a tank-mounted apparatus.

In the hydrogen station, the filling equipment may be arranged adjacent to a side portion of the housing. In this way, an installation area of the entire system including the gas supply system and the filling equipment can be further reduced.

The invention claimed is:

1. A gas supply system which is to be connected with filling equipment for filling gas into a tank-mounted apparatus, and which is to be connected with a pre-cooling heat exchanger for cooling the gas just before being filled into the tank-mounted apparatus, the pre-cooling heat exchanger connected with the filling equipment, the gas supply system comprising:
    a compressor unit including a driver, and a compressor configured to compress the gas by being driven by the driver;
    an accumulator unit connected with the compressor unit, and including a plurality of accumulators and configured to store the gas discharged from the compressor unit, the accumulator unit being connectable with the filling equipment;
    a refrigerator to be connected with the pre-cooling heat exchanger, configured to provide the pre-cooling heat exchanger with a cooling medium;
    a gas cooler fixedly connected to the compressor of the compressor unit, and configured to perform heat exchange of the gas flowing from the compressor of the compressor unit to the plurality of accumulators with cooling fluid to thereby cool the gas, the gas cooler including a laminated body having a plurality of gas flow paths in which the gas flows, and a plurality of cooling flow paths in which the cooling fluid flows, the plurality of gas flow paths and the plurality of cooling flow paths are alternately laminated on one another, the gas cooler having a size smaller than the compressor unit; and
    a rectangular parallelepiped housing configured to house at least a part of the refrigerator, the compressor unit, and the accumulator unit.

2. A gas supply system according to claim 1, wherein the accumulator unit is located laterally to the compressor unit, and the part of the refrigerator is located at least either below the accumulator unit or above the compressor unit.

3. A gas supply system according to claim 1, wherein the accumulator unit is located above the compressor unit, and the accumulator unit and the compressor unit extend along one side portion of the housing,
    a condenser configured to condense the refrigerant compressed by the refrigerant compressor by the flow of air, and
    an expander configured to expand the refrigerant flowing out from the condenser; and the evaporator, the refrigerant compressor and the expander are arranged in the housing and the condenser is arranged on a top portion of the housing.

4. A gas supply system according to claim 1, wherein:
the accumulator unit is located above a bottom portion of the housing; and
each of the plurality of accumulators includes a projecting portion projecting from the housing.

5. A gas supply system according to claim 4, further comprising a cover member for covering the projecting portions, wherein:
an upper surface of the cover member is flush with that of the housing.

6. A gas supply system according to claim 1, wherein:
the plurality of accumulators are arranged in parallel in a horizontal plane.

7. A gas supply system according to claim 1, wherein:
the accumulator unit further includes connecting portions provided for the respective plurality of accumulators; and
the plurality of accumulators are respectively connectable to other accumulators via the connecting portions.

8. A gas supply system according to claim 1, further comprising a heat exhauster arranged on a top portion of the housing and configured to cool the cooling fluid by the flow of air.

9. A gas supply system according to claim 1, wherein:
the refrigerator includes:
an evaporator configured to cool the cooling medium by evaporating a refrigerant,
a refrigerant compressor configured to compress the refrigerant flowing out from the evaporator.

10. A gas supply system according to claim 1, wherein:
the plurality of accumulators extend along a side portion of the housing having a surface substantially perpendicular to an arrangement direction in which the compressor unit and the accumulator unit are arranged.

11. A gas supply system according to claim 1, wherein:
the housing includes a top portion formed with an opening; and
the compressor unit is below the opening.

12. A gas supply system according to claim 1, wherein:
the number of the plurality of accumulators is three; and
one of the three accumulators is connectable with a low-pressure region of a tank in the tank-mounted apparatus, another one is connectable with a medium-pressure region, and the other one is connectable with a high-pressure region when the filling equipment fills the gas into the tank-mounted apparatus.

13. A gas supply system according to claim 1, wherein:
the compressor unit and the accumulator unit are in a first portion of the housing, and the part of the refrigerator is in a second portion of the housing, the first portion is more resistive to explosion than the second portion;
further comprising a control unit configured to control the compressor unit, the accumulator unit, and the refrigerator.

14. A gas supply system according to claim 1, comprising a receiving unit configured to receive the gas to be sucked into the compressor from outside, wherein:
the filling equipment is arranged at a side opposite to the receiving unit with respect to the compressor unit in a longitudinal direction of the accumulators.

15. A hydrogen station, comprising:
filling equipment; and
a gas supply system according to claim 1 configured to supply hydrogen gas to the filling equipment,
the filling equipment filling the hydrogen gas into a tank-mounted apparatus.

16. A hydrogen station according to claim 15, wherein the filling equipment is arranged adjacent to a side portion of the housing.

* * * * *